Dec. 28, 1965    M. A. DI COSOLA    3,225,760
APPARATUS FOR TREATMENT OF BONE FRACTURE
Filed Nov. 14, 1962    4 Sheets-Sheet 1
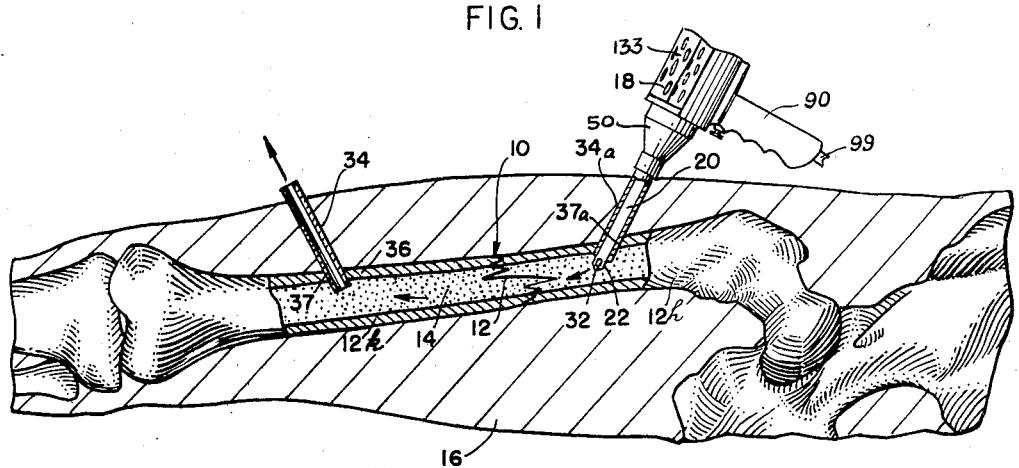
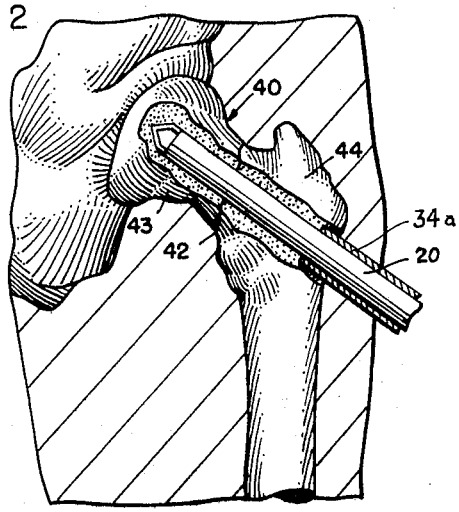
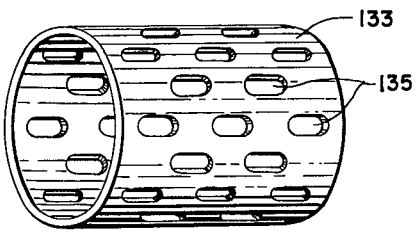
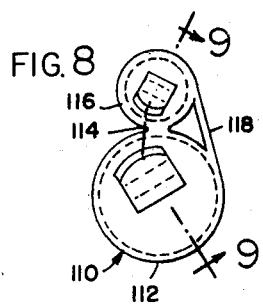
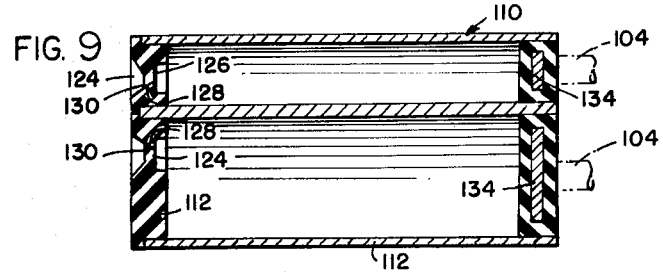
INVENTOR
MICHAEL A. DiCOSOLA
BY
ATT'Y.

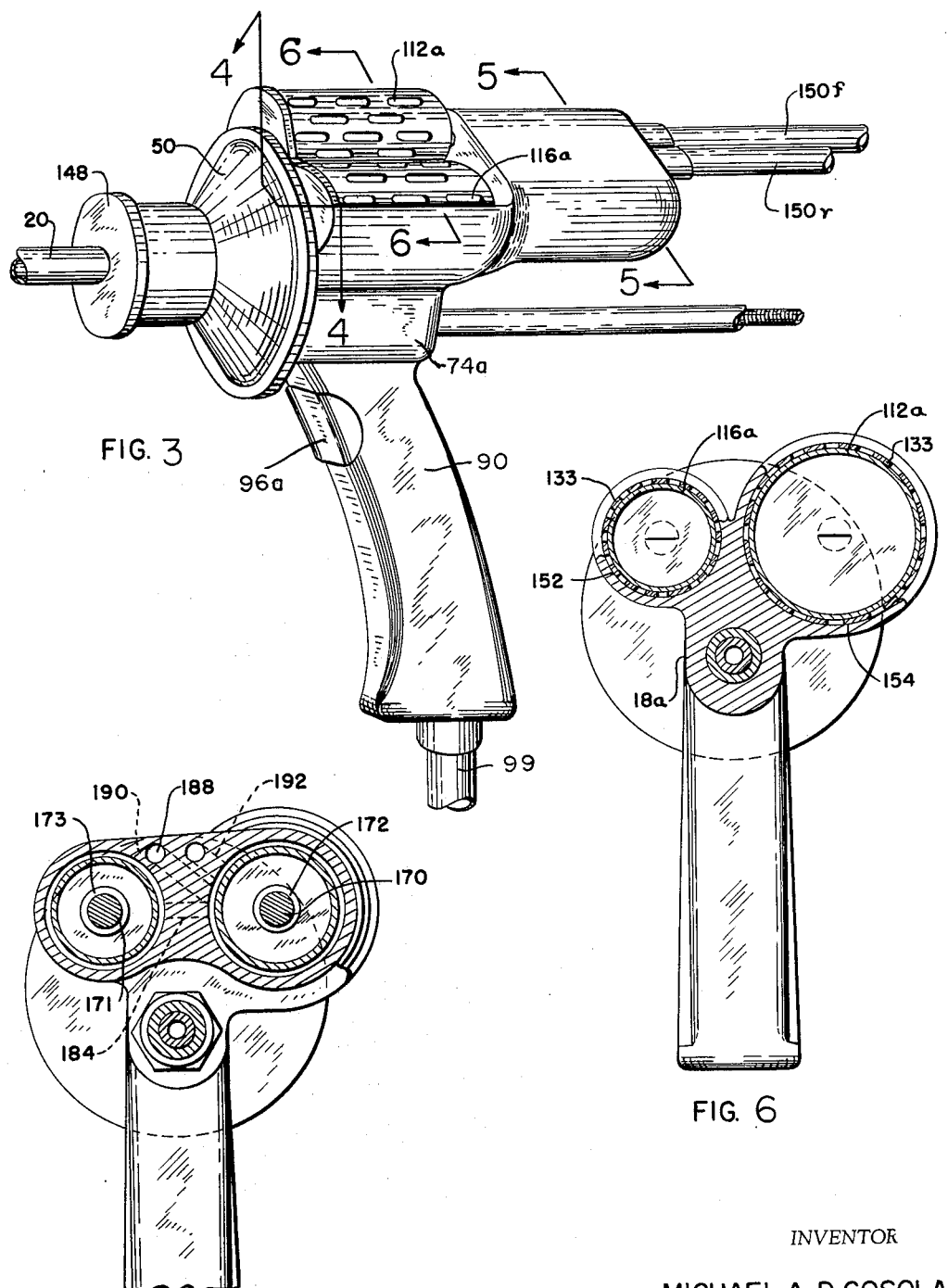

Dec. 28, 1965   M. A. DI COSOLA   3,225,760
APPARATUS FOR TREATMENT OF BONE FRACTURE
Filed Nov. 14, 1962   4 Sheets-Sheet 3

INVENTOR
MICHAEL A. DiCOSOLA
BY
ATT'Y.

Dec. 28, 1965    M. A. DI COSOLA    3,225,760
APPARATUS FOR TREATMENT OF BONE FRACTURE
Filed Nov. 14, 1962    4 Sheets-Sheet 4
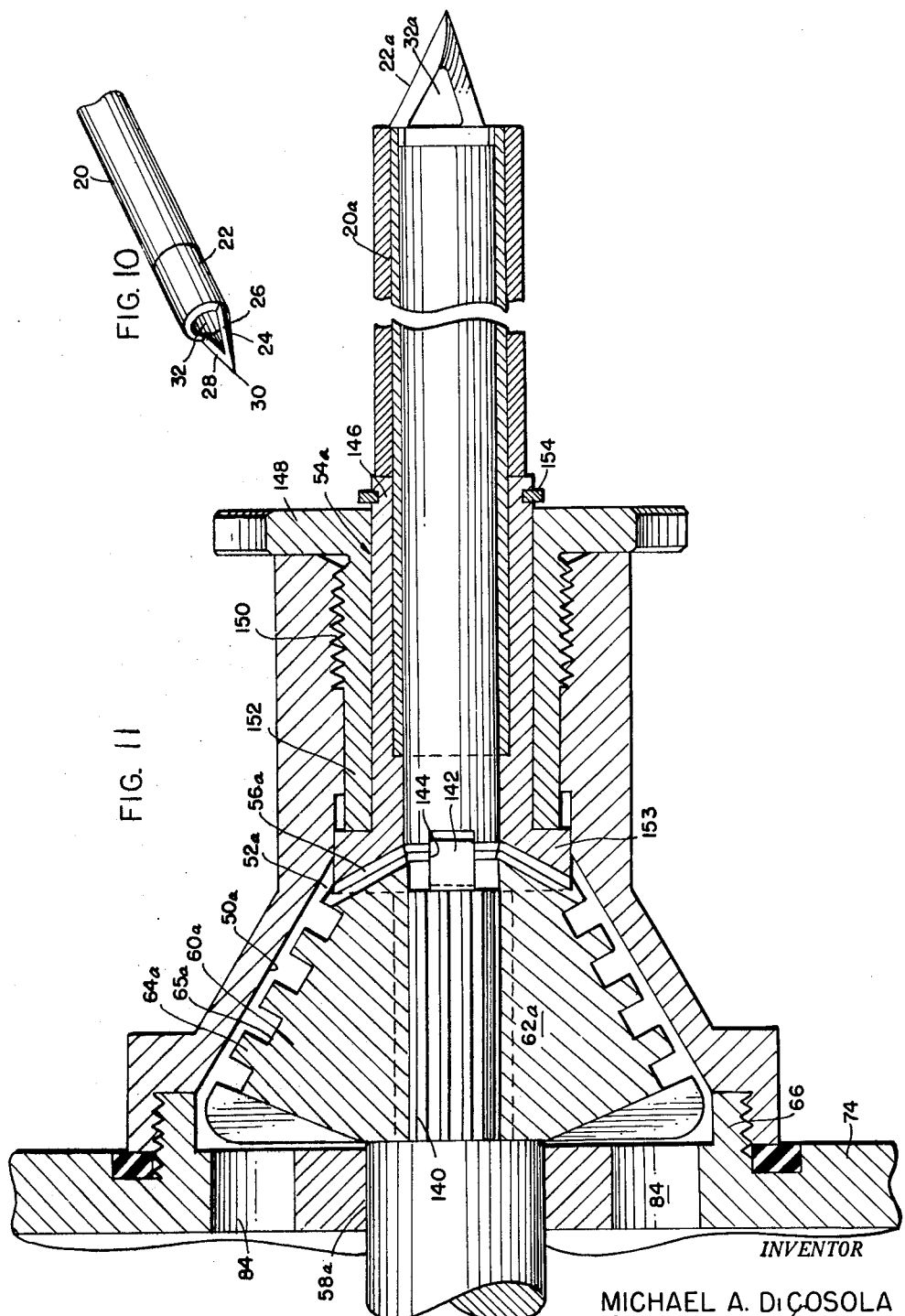
INVENTOR
MICHAEL A. DiCOSOLA
BY
ATT'Y

3,225,760
APPARATUS FOR TREATMENT OF BONE FRACTURE
Michael A. Di Cosola, Sarasota, Fla., assignor to Orthopaedic Specialties Corp., Sarasota, Fla., a corporation of Florida
Filed Nov. 14, 1962, Ser. No. 237,688
7 Claims. (Cl. 128—83)

This application is a continuation-in-part of the application, Serial No. 56,618, filed September 1, 1960, which issued as U.S. Patent No. 3,112,743 on December 3, 1963.

The present invention relates to orthopedics and particularly to an apparatus for the treatment of broken and fractured bones and contemplates the development of a lacunar-like system for the endochendral proliferation of new bone without the necessity of open reduction.

Polyurethane foam, having qualities of strength, adhesiveness and tensional stability that are required for stabilizing orthopedic conditions has been used conventionally to treat long bone fractures as a plastic bone graft by open reduction in which the broken bone is exposed by incision, a lid spanning the fracture is cut and lifted out, the marrow removed, the medullary canal scraped, the polyurethane mixed and poured in place, the lid returned in place and the incision sutured and bandaged. The present invention can be used in this conventional process as well as other processes to mix and inject the polyurethane in place.

The polyurethane foam is a plastic belonging to the class of organic compounds called polymers and is preferably derived by mixing exact proportions of two viscous liquids, essential four (4) parts by weight of a polyol bonded to an aromatic polyisocyanate and one part of a mixture of aliphatic tertiary amines and water in precise ratio as provided by the Wm. S. Merrell Company under the identification of Ostamer. It is important that the mixing be thorough because the ingredients should not contact living tissue separately.

One important problem involved with the open reduction use of a polyurethane plastic is the rapidity with which the surgeon must act once the bone is prepared because the polyurethane begins almost immediately to liberate $CO_2$ so that it foams and progresses rapidly into a plastic state which results in a rigid, porous foam. Heretofore, a mixing of the ingredients must be carefully completed in less than 10 seconds under open and sterile conditions and must be poured in place within the next twenty seconds for adequate and proper bonding, expansion and setting. The setting occurs in five minutes.

An object of the present invention is to provide an improved and novel apparatus for use in mixing polyurethane.

A further object of the invention is to provide an improved apparatus for splinting a bone fracture, preferably internally, in which preliminary preparation can be accomplished with care, and polyurethane is progressively mixed at as rapid a rate as desired with minimum power requirement and simultaneously injected into the bone as needed.

More particularly the apparatus embodying the invention contemplates a use, by way of example, represented by an orthopedic procedure in which bone fracture members set in proper place receive an internal splint. A small drill is passed between tendons in the areas beyond the muscle tissue itself and a hole is drilled through the bone-cortex on one side of the fracture. A tube is placed therein and then a hole is drilled through the bone cortex on the opposite side of the fracture with a tubular drill bit and then with the drill preferably still rotating at the desired limit of its advance a polyurethane is progressively mixed and injected into the medullary canal to force and remove the marrow out through the first tube until polyurethane begins to appear at the mouth of the first tube so that $CO_2$ expansion or foaming of the polyurethane which follows very quickly will, in its confinement, force the polyurethane into all interstices and into unscraped cavities and around internal ridges and into the medullary canal ends beyond the drilled openings before the polyurethane begins to set. Thereafter the tube and drill are removed to break off the sprue and permit the tendons to resume their positions. The bone is held immobile for ten minutes longer and thereafter the patient may move the bone to relieve any discomfort. The drill openings through the skin can be closed by a patch bandage and upon the elapse of forty-eight hours or less, normal use of the bone can be considered with no need to consider healing time of muscle tissue other than that which might be involved because of damage by the bone fragments themselves.

The invention is characterized by immediate mixing with manual control and a full flow of polyurethane into place with no delay after mixing. Thus, within the brief time that it is fluid, the space available has been filled as desired, the release of $CO_2$ which is expected to follow almost immediately packs the bone under full pressure developed by the foam with the potential volume of the plastic foam being twice that of the liquid at atmospheric pressure. The pressure is a gas pressure and its potential expansion would be at least one-half the volume of the liquid. Thus the resulting pressure would be less than 15 p.s.i. gauge if all the $CO_2$ were to be liberated. Moreover, the $CO_2$ is miscible in the blood.

A further object of the invention is to provide an improved compact apparatus which mixes two ingredients surely and progressively and ejects the mixture at a particular point under pressure, yet may be easily cleaned rapidly and used again immediately for further or different work or mixing operations in rapid succession.

The invention is also characterized by a capsule arrangement and construction wherein materials to be mixed are not exposed for mixing except in the right proportion and only then as progressively needed under the manual control of the operator.

The mixing-ejecting apparatus of the present invention progressively mixes viscous material as distinguished from batch mixing so that it may be powered by low power motors normally used and found in operating rooms of hospitals for orthopedic work and in its preferred embodiment provides for manual control of the functions of the apparatus through power applied electrically and hydraulically.

It has also been found that polyurethane, while weakened by contamination with water, does not lose its strength when mixed and transferred directly into living cell structure and for that reason curetting and drying of bone structure is not required as in open reduction practice, and with the full flow of the polyurethane there is little likelihood of medullary ooze contaminating working body of pure polyurethane.

With the present invention not only are long bones better treated but access may be had to inject polyurethane into porous portions of short bones, femoral necks to treat fractures similar to intertrochanteric or subtrochanteric fractures of a femur with the result that pinning effects can be accomplished by polyurethane foam elements deposited in situ by the hollow drill as it is withdrawn, or, the polyurethane foam deposited can be used as foundation for metal pins if bone structure is otherwise weak or somewhat shattered.

These being among the objects, advantages and characteristics of the invention other and further ones will become apparent from the claims, the description and the drawings relating thereto in which:

FIG. 1 is a side elevation of a portion of a person's leg or thigh showing a fracture of a long bone such as a femur being internally splinted by the apparatus of the present invention;

FIG. 2 is a side elevation showing a fractural femoral being treated with apparatus embodying the invention;

FIG. 3 is a side elevation of a manually operated combination drilling, mixing and cleaning apparatus embodying a power driven embodiment of the invention in perspective.

FIG. 5 is a sectional view taken on line 5—5 in FIG. 3;

FIG. 6 is a sectional view taken on line 6—6 of FIG. 3;

FIG. 7 is a perspective view of the capsule receiving container showing another embodiment of the invention;

FIG. 8 is a valve end view of a unitary ampule;

FIG. 9 is a longitudinal sectional view through the ampule compartments taken on line 9—9 in FIG. 8;

FIG. 10 is a longitudinal section of the bit end of the hollow drill through which the mixture is ejected; and FIG. 11 is a longitudinal section of the preferred construction of the mixing chamber and clutch drive of the drill.

Figure 4:
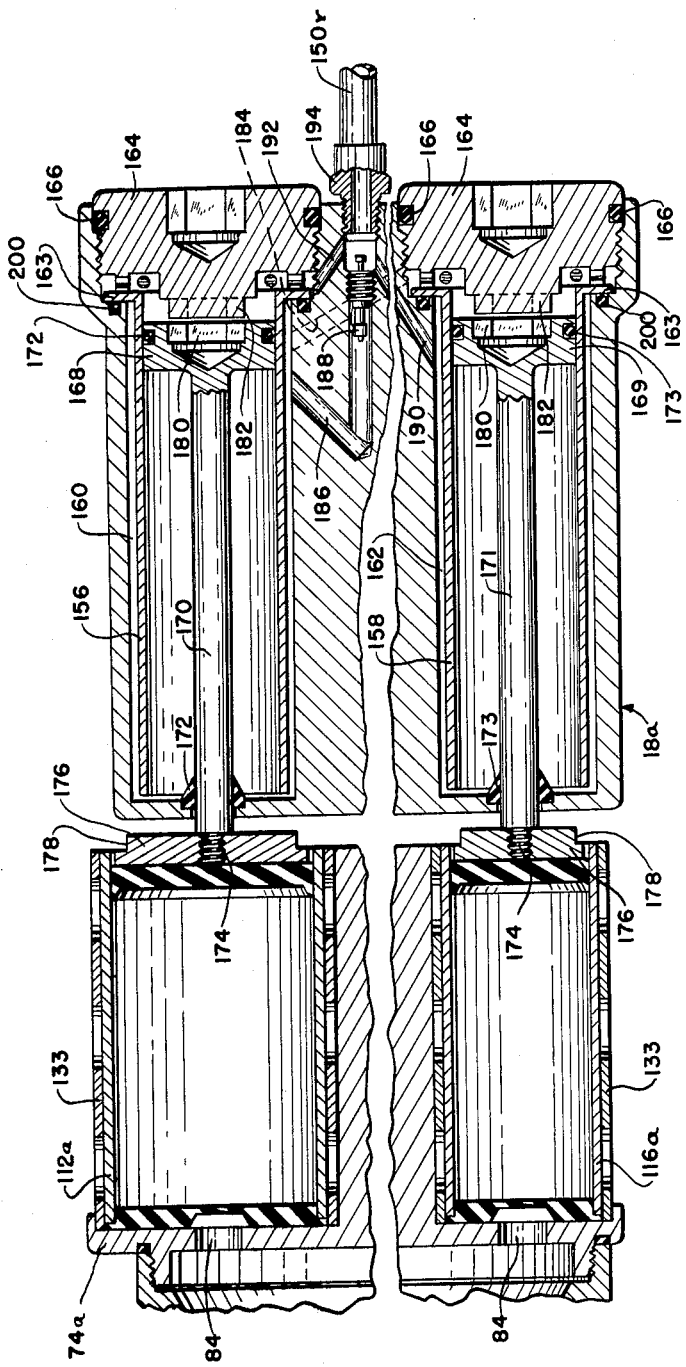
FIG. 4 is a sectional view taken on line 4—4 in FIG. 3 with the relationship somewhat diagrammatically flattened out to show the conduit connections existing third dimensionally.

Referring now to FIG. 1, a femur 10 is shown having a break or fracture at 12 between the hip end section 12h and the knee end section 12k. The medullary canal in the bone is diagrammatically shown at 14 and extends across or through the fractured side. The flesh on the thigh around the femur is indicated at 16. The orthopaedic tool comprising a drilling and mixing gun 18, which will be described in further detail later in connection with FIG. 3, has a hollow tube drill 20 provided with an axially and radially ported bit 22 (FIGS. 10 and 11). In FIG. 10, the bit comprises a tapered tip 24 sharpened half away to leave right and left hand turn cutting edges 26 and 28 respectively, which define the port 32 behind a point 30. Another form of the ported bit is shown in FIG. 11 at 22a which comprises a tapered triple cutting edge spider 24a for right hand turn cutting. Other bone drills may be used but it will be noted that the one indicated in FIG. 10 cuts in either direction of rotation provided by the motor, it being appreciated however that regardless of direction, material may be forced through the tube and discharged radially and axially of the drill through an end opening such as 32a.

The drill 20 is of sufficient length to extend through the flesh and into the bone at an angle of as much as 45° so that it may be located and directed between muscles and muscle tendons adjacent to their ends to save damage to the muscle tissue and still reach the medullary canal in the bone when penetration of the bone cortex is completed.

After the fractured bone 10 has been manually set by the doctor, it is immobilized as by sand bags or even a partial case (not shown) and local anesthesia is applied. Thereupon, the drill 20 preferably receives a thin wall sleeve or tube 34 on it and is woven between tendons and muscle coverings until the point comes to rest upon the cortex 38 of bone 10 at a selected spot. Whereupon, the drill is rotated inside the tube, to prevent damage to the flesh, until the bone cortex 36 is perforated as at 37 and the bit advances deep into the medullary canal 14. Then the drill is removed leaving the tube 34 in place to vent the medullary canal to atmosphere or to a suction pump (not shown).

Another sleeve 34a like the first is preferably placed on the drill 20 and on the opposite side of the fracture 12, adjacent the other end 12h of the bone 10, the drill 20 and sleeve 34a are threaded between muscles and tendons to engage the bone cortex 36. The drill again is rotated to penetrate deeply into the other end of the medullary canal 14. The second sleeve need not be used but it is preferred to serve as a guide and depth gauge for the bit 22 in the operative steps that follow.

The chips (not shown) formed by the drill are small and are intentionally comminuted by the drill so as not to interfere with the flow of material into or out of the medullary canal.

The drill is then charged with a viscous polyurethane mixture under pressure (as later described) and this flows through the drill 20 and bit port 32 preferably while they rotate to spread the mixture in all directions in the immediate region of the medullary canal. The flow of the viscous mixture into the medullary canal displaces marrow and other fluid contents of the medullary canal ahead of it out through the tube 34 until polyurethane begins to appear whereupon the tubes 34 and 34a are withdrawn enough to clear the bone cortex and fill the openings 37 and 37a in the bone cortex with polyurethane. Then the drill is removed and immediately cleaned.

After the polyurethane has set the tubes 34 and 34a are manipulated to break the polyurethane that is disposed between them and the bone and then withdrawn to permit the tissues 16 and skin to close and heal. This leaves an intermedullary splint of polyurethane foam wholly within the contour of the bone which has expanded into all the irregularities of the medullary canal 14 to hold the bone parts 12k and 12h in fixed position with polyurethane foam forced into any interstices associated with the fracture 12.

In FIG. 2 is shown a novel way of pinning a femoral neck fractured at 42. After the two bone parts 43 and 44 are set and immobilized, the drill 20 is threaded between muscles and tendons and propelled through the two parts to the depth shown, preferably with a thin metal sleeve on it. The drill is then removed from the tube and cleared of bone debris and the drill then charged with polyurethane and returned to its working position whereupon pressure is applied to the polyurethane and more slowly than the polyurethane is discharged the drill and tube 34a are withdrawn so that the polyurethane expands into the lacunae of the bone structure. The tube 34a is withdrawn from the bone cortex and the opening filled and when clear of the bone the drill is removed and cleaned and the tube is left in place until the polyurethane is set. Thereupon the tube is manipulated to sever from the bone any polyurethane beyond the bone and such is removed with the final withdrawal of the tube.

Referring now more particularly to the orthopaedic apparatus or tools shown in FIGS. 3 through 6, it is to be appreciated that in orthopedic surgery whatever splinting material is used, whether it be polyurethane or some other material, such has to be a composition of exact proportions of a plurality of ingredients which must be enduring for long periods of time when stored separately, but when mixed will act quickly to form the desired end product. This leaves very little time for a surgeon to perform his tasks and much of this time is encroached upon by the batch mixing time generally required and the prolongation of time encountered to use the entire batch within its usable time. Maybe only seconds remain available. Electric power for mixing and available space are also at a premium under such conditions and most often special motors or auxiliary power are needed where rapid, clockwork activity is required. These factors make the conventional operation ponderous.

In the present invention, the surgeon is greatly relieved of the pressure of time involved in handling fast-acting ingredients. As shown in FIG. 11, a conical mixing chamber 50a is provided having its outlet 52a at the apex where it journals the base 54a of the hollow drill 20a in sealed relation and discharges into the hollow drill 20a through a spider or openings 56a which detachably supports the drill in clutched relationship with a drive shaft 58a, a mixing element 60a, or both. The mixing element 60a is also received on a reduced portion 62a of the drive shaft 58a and has teeth 64a on its outer conical counter whose outer ends run with close clearance inside the mixing chamber 50a.

With the end of the teeth 64a running close to the wall of the mixing chamber 50a as shown, sufficient shear is present therebetween for the viscous liquids to be rapidly and thoroughly mixed in the shallow spaces 65a around the teeth, the shear drag continually turning the viscous liquid mixture in the spaces for rapid and intimate mixing purposes and the spaces further serving as flow passages for the advancement of the mixture from the major diameter of the cone to the minor diameter with an accelerating flow towards the discharge openings 56a.

The rotation of the drill 20a may be stopped when it is desired to have it serve as a material conducting tube without rotation. At its front end, the shaft is splined at 140 to drive the mixing element continuously but cross-tongued at 142 at the end to engage a groove 144 on the drill when advanced towards each other to engage each other. The butt of the drill 20a is mounted in a shouldered sleeve 146 that is journalled in a gland nut 148 threaded as at 150 on the housing of the mixing chamber for rotational movement that results in reciprocation of its inner end 152 against the flange 153. A C-spring 154 axially locates the shank of the drill with respect to the gland nut 148 against separation whereby by manipulation of the gland nut reciprocating the drive clutch of the cross-tongue and groove can be engaged and disengaged.

Flow openings into the mixing compartment are arranged peripherally around the base of the conical mixing chamber 50 as at 84 for direct access to the mixing area and the supply of materials used in the mixing chamber and also for cleaning the mixing chamber will now be described. Support on a gun of the construction described is had on the base 74a by a ring boss 66 cast integrally on the front face thereof to receive the mixing chamber member 50a in supported and concentric relationship with respect to the drive shaft 58a.

A rigid handle 90 is provided with a conduit 99 therethrough and opening through a back flow check valve (not shown) into the mixing chamber inside the ring boss 66. Flow of cleaning fluid through the conduit may be controlled by suitable means such as valved compressed air. When the air under pressure is applied, it forces the cleaning fluid to flush the mixing chamber 50a and hollow drill 20a and then purges and dries same with the air whenever desired.

The ampules can be made unitized or separately. If unitized, the body of the ampule 110 (FIGS. 8 and 9) preferably is a plastic extrusion which is cut off to the exact length desired and comprises two (or more) cylindrical portions 112 disposed side by side, with their cross-sectional areas exactly proportioned for the ingredients which are to be mixed. The ampule 110 is shaped so that it will be received in place on the gun in one position only as where the cylinders are joined at their line of tangency 114 to provide a downwardly facing cavity 116, while their upper edges are joined non-symmetrically by a web 118 preferably tangent to both cylindrical walls. To assure the correct positioning of the ampule the gun is correspondingly shaped to mate with the cavity 116 but interfere with the web 18.

The end 120 of the ampule adjacent to the base 74a received two soft elastomer plugs 122 recessed at 124 opposite the respective openings 84 to provide a thin wall structure 126 cut as at 128 to provide flapper valves 130 opening directly into the openings 84. The plugs 122 are of diameters corresponding to the diameters of the cylinders and overlap the ends thereof to rest against the base 74a to establish a seal therebetween when they are compressed under internal pressure and external back pressure. A marginal flange 132 around the edge of the base 74a holds the ampule in proper place against inadvertent dislodgement.

The other ends of the cylinders receive reinforced piston closures 134 which are engaged by the rods 104 and advanced by the carriage to discharge the contents of the cylinders to the mixing chamber through valves 130 in exactly proportioned quantities progressively. Preferable the walls of the ampules are transparent to ascertain the amount of liquid therein but need not be so because indicia may be placed on the track and slide to indicate the amount of ingredients remaining and to support the cylindrical walls against internally exerted feed pressures with the ampules separated, the wall may be received in removable relationship in stainless steel sleeves 133 having staggered windows 135 to ascertain the position of pistons such as 134 therein.

The ampules are charged with the ingredients under sterile conditions by a needle (not shown) through the rubber wall 122 with the air venting through the flapper valves 130 until completely filled. They are packed in sterile containers. Preferably the larger cylinder holds 61 cm. of polyol bonded to an aromatic polyisocyanate and the small cylinder is charged with a catalyst of 15 cm. of a mixture of aliphatic tertiary amines and water in a precise ratio.

In this connection reference is made to FIG. 3 where separate ampules are used and the feed of the ingredients and the retraction of the feed pistons is accomplished hydraulically by alternate applications of hydraulic pressure from a source (not shown) through hoses 150f for "forward" movement of the pistons and 150r for "reverse" movement. The ampules 116a and 112a are received in sleeves 133 of proper size and cradled in suitable upwardly opening recesses 152 and 154 respectively preferably concentric with apertures 84.

Although a shotgun type break hinge can be used if desired it is preferred to mount rigidly and integrally in the body 18a two cylinder sleeves 156 and 158 concentric with the capsules. The sleeves are received in rearwardly opening cavities 160 and 162 respectively, each in open communication with their respective cavities at their inner ends. The outer ends of the sleeves are flanged at 163 for holding them in place and sealed by resilient O-ring seals 162 suitably disposed between the housing and the external sleeve walls. The cavities are closed by plugs 164 spaced from the outer ends of the sleeves but sealed by O-rings 166 with respect to the housing at the mouth of the cavities.

Pistons 168 and 169 are slidably mounted in the sleeves and have piston rods 170 and 171 respectively which extend through the bottom walls of the respective cavities 160 and 162 where they are sealed by elements 172 and 173 respectively. The forwardly extending working ends of the pistons are threaded as at 174 to receive interchangeably thereon working heads 176 of sizes suitable for use with the sizes of ampules employed. The heads 176 are hex shaped or notched at 178 for wrenching "on" or "off" of the pistons. Also the pistons 168 and 169 have wrenching sockets 180 in them to hold them against turning when the heads are tightened or removed and wrenching heads 182 on the plugs engage in sockets 180 when the pistons are in fully retracted position.

Within the body 18 are certain channels by which hydraulic fluid under pressure is utilized to drive the pistons forwardly and rearwardly at the same lineal speed to assure proper proportions in the polyurethane mixture as controlled by the trigger 96a through a solenoid valve (not shown). The cavity 160 is in open communication with the outer end of the sleeve 158 through passage 184 that is drilled diagonally from one cavity to another as shown in FIGS. 4 and 5. Also cavity 160 is in communication with the "reverse" hose 150r and the cavity 162 through passage 186, a Dill valve 188 and passage 190 is drilled and plugged as shown in FIG. 5. The hydraulic hose 150f is in continuous communication with the outer end of the cylinder 156 through conduit 192. The Dill valve closes towards the hose 150r.

Appreciating that each of the hoses serves as a hydraulic pressure supply while the other alternatively therewith serves as a return hose depending upon the selection made at the hydraulic source, it will be appreciated from the description that hydraulic pressure applied through 150f and passage 192 will advance piston 168 and hydraulic fluid ahead of it will pass through passage 184 to advance piston 169 with the hydraulic fluid ahead of it being displaced to return to the source through passage 190.

In order to assure the same lineal speed for the pistons, the area of the outer surface of piston 169 is equal to the area of outer surface of the piston 168 minus the cross sectional area of its piston end 170. Thus, piston 169 moves the same distance as piston 168, the hydraulic fluid being incompressible and confined to do its work.

The pistons feed the ingredients in the correct proportion and when the apparatus is to be recharged with full capsules, the hydraulic pressure is applied to hose 150r and the reverse flow restores the apparatus, the piston 169 being moved outwardly by hydraulic pressure received through passage 190 and its displacement returning hydraulic fluid to the cavity 160 to retract the piston 168. Any discrepancy that might occur in movement of the pistons can be adjusted to for by the Dill valve 188 opening. The discrepancy would occur only through loss of fluid from between the pistons whereupon same would be replenished after the piston 169 is fully retracted. Slight turning of the heads 176 will assure full retraction and engagement at the sockets 180, particularly when the heads 176 are to be loosened. Moreover, it will be appreciated that seals 172 and 173 are under pressure during both strokes of the piston cycles, thus preventing air from entering the system. In this connection, although not shown, it will be appreciated that conventional dual valve connection may be used as represented at 194 to close the hoses and the passages 190 and 192 to atmosphere whenever disconnected.

Although it is possible to install manual switches on the housing 18 or in the handle 90 it is preferred that the trigger switch 96a concealed for sanitation by a flexible cover on the handle be connected to operate the supply of hydraulic fluid. It is preferred that the flushing switch, the hydraulic reversing control and the drill drive control be located remote from the gun where they can be operated by others as well as the surgeon. Thus inadvertent actuation is avoided yet the significant function of mixing and ejecting polyurethane is a trigger like control on the handle of a gun that is balanced and light of weight.

When mixing and ejection is finished, the gun can be handed to an assistant who can flush it immediately and thoroughly and recharge it if necessary. Furthermore, the parts are readily disassembled for brush cleaning if necessary or urgent.

Moreover, it will be observed that all connections are fully exposed for make up and loosening and all parts can be sterilized without damage to the apparatus or the materials used. Furthermore, it may easily be serviced and repaired in a short period of time.

Having thus described the invention it will be readily apparent how the stated and other objects are attained and how various and further changes can be made without departing from the spirit of the invention, the scope of which is commensurate with the appended claims:

What is claimed is:

1. A device of the class described comprising a housing having a mixing chamber with an outlet at one end,
    a mixing member rotatably mounted in the chamber,
    a hollow member extending through said outlet coupled to said mixing member and having openings in communication with said chamber,
    means carried by said housing for progressively supplying ingredients to said mixing chamber under pressure in a predetermined proportion to place the mixing chamber under pressure and force mixed ingredients in the chamber out through said hollow member,
    said means including a plurality of ingredients containing capsules of approximately the same length each having a movable wall,
    a plurality of cylinders and a plurality of pistons in said cylinders for engaging said movable walls,
    conduit means interconnecting the cylinders from the discharge side of one piston to the power side of another piston,
    means supplying the power side of said one of the pistons in its cylinder with hydraulic fluid under pressure, and
    means for receiving fluid from the discharge side of said other piston in its cylinder for moving pistons simultaneously.

2. The combination called for in claim 1 in which a conduit interconnects said conduit means and said fluid receiving means including a check valve opening from the fluid receiving means in the direction of said conduit means.

3. A device of the class described comprising a housing having a mixing chamber with an outlet at one end,
    a mixing member rotatably mounted in the chamber,
    a hollow member extending through said outlet coupled to said mixing member and having openings in communication with said chamber, and
    means for progressively supplying ingredients to said mixing chamber under pressure in a predetermined proportion to place the mixing chamber under pressure and force mixed ingredients in the chamber out through said hollow member including
    two hydraulic devices each including a piston and piston rod reciprocable in cylinders, one of said devices having an advancing volume on the head side of one piston connected to and equal to the displaced volume on the piston rod side of the other piston when actuated in the same direction the same distances.

4. The combination called for in claim 3 in which the last mentioned means includes an ampule means having two compartments of different diameters and a movable piston wall for each compartment actuated by said devices separately but simultaneously.

5. An orthopaedic tool comprising a housing having a mixing chamber with an outlet at one end thereof,
    a mixing member rotatably mounted in the chamber,
    a drive member journalled in said housing and rotating said mixing member,
    a tubular element extending through said outlet and journalled therein in communication with said chamber,
    ampule means for storing and progressively supplying exactly proportioned liquids to said mixing chamber comprising a plurality of cylinders disposed side by side,
    means for closing one end of each cylinder including an elastomer element having an outwardly opening check valve in the wall thereof,
    piston means slidably closing the other end of each cylinder,
    means for supporting the ampule means on said housing with said check valves in communication with said mixing chamber, and
    manually controlled means for simultaneously driving said piston means in each cylinder towards the elastomer element to progressively discharge the contents of the cylinders into said mixing chamber to be mixed there and forced out through the tubular element and the said drill bit passageway including
    a drive piston for each one of said piston means, and hydraulic means for advancing said drive pistons simultaneously in the same direction at the same rate.

6. A device of the class described comprising a housing having a mixing chamber with two spaced inlets and one outlet,
  means rotatable in said chamber for mixing ingredients supplied through said inlets,
  means for supplying said ingredients under pressure in a predetermined proportioning including,
  two ampules means having walls with openings in close proximity to said inlets in communication therewith and movable walls remote therefrom,
  two hydraulic devices including cylinders coaxial with said movable walls, piston rods engaging said movable walls to displace them in the same direction and pistons in said cylinders to drive said piston rods,
  means for applying fluid pressure to one of the cylinders against the head of the piston therein,
  means interconnecting said one cylinder on the rod side of said piston therein to the other cylinder on the head side of the piston therein for applying hydraulic pressure between said pistons for movement in the same direction,
  the open cross-sectional areas of said sides of the pistons in the cylinders being equal for equal lineal movement of the pistons in the same direction.

7. An orthopaedic tool comprising a housing having a conical mixing chamber with an outlet at the small end thereof,
  a mixing member rotatably mounted in the chamber having teeth running in close proximity to the conical wall of the mixing chamber,
  a drive member journalled in said housing and rotating said mixing member,
  a tubular element extending through said outlet and journalled therein in communication with said chamber,
  releasable clutch means between said tubular element and one of said members for selectively rotating said tubular element,
  said tubular member having a drill bit on the end thereof with a passageway therethrough,
  separate ampule means for storing and progressively supplying exactly proportional liquids to said mixing chamber comprising a plurality of cylinders supported side by side on said housing,
  means for closing one end of each cylinder including an elastomer element having an outwardly opening check valve in the wall thereof,
  means for closing the other end of each cylinder,
  one of said means in each cylinder being slidable towards the other of said means in the cylinder to displace liquids therein through the check valves,
  means for securing the ampule means on said housing with said check valves in communication with said mixing chamber,
  hydraulic means including elements engaging said one of said means in each cylinder for advancing same and a hydraulic element under pressure for driving said elements, and
  manually controlled means between said hydraulic element under pressure and said elements for applying said hydraulic element simultaneously to said elements to drive said one of said means in each cylinder towards the other means the same distances to progressively discharge the contents of the cylinders into said mixing chamber to be mixed there and forced out through the tubular element and the said drill bit passageway.

References Cited by the Examiner
UNITED STATES PATENTS

| | | | |
|---|---|---|---|
| 434,089 | 8/1890 | Massey | 250—53 |
| 1,035,170 | 8/1912 | Dewett | 103—49 |
| 2,862,449 | 12/1958 | Wyland | 103—49 |
| 2,970,773 | 2/1961 | Keryluk | 239—142 |
| 2,981,308 | 4/1961 | Thompson. | |

RICHARD A. GAUDET, *Primary Examiner.*

JORDAN FRANKLIN, *Examiner.*